United States Patent
Shi et al.

(10) Patent No.: US 12,460,944 B2
(45) Date of Patent: Nov. 4, 2025

(54) DEVICE FOR CALIBRATING LASER LEVEL

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 323 days.

(21) Appl. No.: 18/044,115

(22) PCT Filed: Jul. 6, 2021

(86) PCT No.: PCT/CN2021/104658
§ 371 (c)(1),
(2) Date: Mar. 6, 2023

(87) PCT Pub. No.: WO2022/142244
PCT Pub. Date: Jul. 7, 2022

(65) Prior Publication Data
US 2023/0314172 A1    Oct. 5, 2023

(30) Foreign Application Priority Data
Dec. 31, 2020    (CN) .......................... 202011629188.8

(51) Int. Cl.
*G01C 15/04* (2006.01)
*G01C 15/00* (2006.01)
*G01C 25/00* (2006.01)
(52) U.S. Cl.
CPC ........... *G01C 25/00* (2013.01); *G01C 15/004* (2013.01)

(58) Field of Classification Search
CPC .............................. G01C 25/00; G01C 15/004
See application file for complete search history.

(56) References Cited

U.S. PATENT DOCUMENTS 3,970,391 A * 7/1976 Johnson ............... G01C 15/004
356/400
4,023,908 A * 5/1977 Johnson ............... G01C 15/004
356/400

(Continued)

FOREIGN PATENT DOCUMENTS

CN    200986436 Y    12/2007
CN    205300605 U    6/2016

(Continued)

OTHER PUBLICATIONS

Machine translation of CN 107121137 (Year: 2017).*

(Continued)

*Primary Examiner* — David J Bolduc
(74) *Attorney, Agent, or Firm* — Anova Law Group, PLLC

(57) ABSTRACT

The present disclosure relates to a device for calibrating a laser level, including a base platform configured to support the laser level that is to be mounted at a first position of the base platform, a laser detector arranged at a second position of the base platform and configured to receive a laser, and an optical path extension device arranged at a third position between the laser level and the laser detector and configured to receive the laser emitted by the laser level and project the laser to the laser detector after the laser is adjusted by the optical path extension device. With the optical path extension device, a physical distance between the laser level and the laser detector can be optically extended.

12 Claims, 2 Drawing Sheets

(56) References Cited

U.S. PATENT DOCUMENTS

| | | | | |
|---|---|---|---|---|
| 5,978,148 A | * | 11/1999 | Oono | G02B 19/0052 |
| | | | | 359/668 |
| 6,288,381 B1 | * | 9/2001 | Messina | G01B 11/26 |
| | | | | 356/138 |
| 2006/0191148 A1 | * | 8/2006 | Lippuner | G01C 25/00 |
| | | | | 33/290 |
| 2015/0308825 A1 | * | 10/2015 | Dumoulin | G01C 9/06 |
| | | | | 356/139.1 |
| 2017/0123052 A1 | * | 5/2017 | Hinderling | G01C 15/002 |

FOREIGN PATENT DOCUMENTS

| | | | |
|---|---|---|---|
| CN | 107121137 A | * | 9/2017 |
| CN | 111024118 A | | 4/2020 |
| CN | 111580072 A | | 8/2020 |
| CN | 112611399 A | | 4/2021 |
| CN | 112798019 A | | 5/2021 |
| CN | 214224153 U | | 9/2021 |
| WO | 0114827 A1 | | 3/2001 |

OTHER PUBLICATIONS

Machine translation of CN 200986436 (Year: 2007).*
The World Intellectual Property Organization (WIPO) International Search Report for PCT/CN2021/104658 Oct. 12, 2021 8 Pages (including translation).

* cited by examiner

DEVICE FOR CALIBRATING LASER LEVEL

CROSS-REFERENCES TO RELATED APPLICATIONS

This application is a national phase entry under 35 U.S.C. § 371 of International Application No. PCT/CN2021/104658, filed on Jul. 6, 2021, which claims priority of Chinese patent application No. 202011629188.8, filed with the State Intellectual Property Office of P.R. China on Dec. 31, 2020, the entire contents of both of which are incorporated herein by reference in their entirety.

TECHNICAL FIELD

The present disclosure relates to the laser measurement field and, more particularly, to a device for calibrating a laser level.

BACKGROUND

A fixed distance is usually used in a traditional method of calibrating a laser level, for example, a fixed distance of 5 meters or 10 meters. Then, the laser level and a detector are fixed at predetermined positions, respectively, to perform calibration on the laser level at the fixed distance. However, in such a solution, the distance between the laser level and the detector is relatively large, a relatively high requirement is imposed on space, and many interference factors exist.

SUMMARY

In view of the deep understanding of the problems existing in the background technology, the inventor of the present disclosure thinks of designing a kind of technology to perform optical lengthening on a physical distance between a laser level and a laser detector with an optical device to lengthen the physical distance in a limited space to improve the calibration accuracy.

Specifically, the present disclosure provides a device for calibrating a laser level. The device includes:
  a base platform, the base platform being configured to support a laser level that is to be mounted at the base platform at a first position;
  a laser detector, the laser detector being arranged at a second location of the base platform and configured to receive laser; and
  an optical path extension device, the optical path extension device being arranged at a third position between the laser level and the laser detector and configured to receive the laser emitted by the laser level and project the laser to the laser detector after the laser is adjusted by the optical path extension device.

With the optical extension device, the physical distance between the laser level and the laser detector can be optically enlarged and extended. Thus, without changing the physical distance between the laser level and the laser detector, the technical effect that the optical path distance between the laser level and the laser detector is enlarged can be simulated. Thus, the laser level can be calibrated according to the enlarged optical path distance to improve the calibration accuracy.

In an embodiment of the present disclosure, the optical path extension device includes:
  an objective lens, the objective lens being configured to receive the laser emitted by the laser level;
  an objective focusing lens, the objective focusing lens being configured to perform focusing processing on a laser received by the objective lens; and
  an eyepiece, the eyepiece being configured to project the laser adjusted by the objective focusing lens to the laser detector.

Thus, the laser can be processed by the objective focusing lens after being received by the objective lens. Then, the laser can be projected to the laser detector by the eyepiece. Thus, the physical distance between the laser level and the laser detector can be enlarged optically after the laser being processed by the objective focusing lens.

In an embodiment of the present disclosure, the optical path extension device further includes a crosshair reticle, wherein the crosshair reticle is arranged between the objective focusing lens and the eyepiece.

In an embodiment of the present disclosure, the objective lens is an objective lens group including a group of objective lenses. That is, the objective lens can include a plurality of sub-objective lenses. A structure formed by the plurality of sub-objective lenses can achieve a better optical effect.

In an embodiment of the present disclosure, the optical path extension device has an optical path extension multiple of a first multiple.

In an embodiment of the present disclosure, the optical path extension device is configured as a level, wherein a center of an optical path of the level is aligned with the laser emitted by the laser level.

In an embodiment of the present disclosure, the base platform further includes:
  a control device, the control device being configured to determine whether the laser level needs to be calibrated based on a simulated distance determined by position data of a first position, a second position, and a third position and an optical extension multiple of the optical extension device, a deviation distance determined by positions of lasers emitted by the laser level at a laser receiver before and after a rotation of a first angle, and the first angle.

In an embodiment of the present disclosure, the base platform further includes:
  a rotation device, the rotation device being configured to rotate the laser level by the first angle based on a control instruction received from the control device. In an embodiment of the present disclosure, the first angle includes an angle value of 180 degrees, 90 degrees, or 270 degrees.

In an embodiment of the present disclosure, when the control device determines that the laser level needs to be calibrated, the control device determines a calibration signal based on the simulated distance, the deviation distance, and the first angle and transmits the calibration signal to the laser level.

In an embodiment of the present disclosure, a wired connection or a wireless connection exists between the base platform and the laser level and/or between the base platform and the laser detector, and the wired connection or the wireless connection is configured to transmit the calibration signal from the control device to the laser level.

In an embodiment of the present disclosure, the wireless connection includes at least one connection manner of an infrared connection, a Bluetooth connection, or a WiFi connection.

In an embodiment of the present disclosure, the device further includes:
  a display unit, the display unit being configured to display a maximum height difference value determined based on a simulated distance, a deviation distance, and a maximum allowable error of the laser level.

In summary, the device for calibrating the laser level of the present disclosure may perform optical enlargement and extension on the physical distance between the laser level and the detector with the optical path extension device. Without changing the physical distance between the laser level and the laser detector, the technical effect that the optical path distance between the laser level and the laser detector is enlarged can be simulated. Thus, the laser level can be calibrated according to the enlarged optical path distance to improve the calibration accuracy.

BRIEF DESCRIPTION OF THE DRAWINGS

Embodiments are shown and explained with reference to the accompanying drawings. The drawings are used to clarify basic principles and thus show only aspects necessary to understand the basic principles. The drawings are not according to scale. In the drawings, same reference numbers represent similar features.

Other features, characteristics, advantages, and benefits of the present disclosure may become more apparent from the following detailed description in connection with the accompanying drawings.

DETAILED DESCRIPTION OF THE EMBODIMENTS

For the following detailed description of preferred embodiments, reference will be made to the accompanying drawings which form a part of the present disclosure. The accompanying drawings show specific embodiments in which the present disclosure can be realized through examples. Exemplary embodiments are not intended to be exhaustive of all embodiments according to the present disclosure. It can be understood that other embodiments may be used and structural or logical modifications may be made without departing from the scope of the present disclosure. Therefore, the following detailed description is not intended to be limiting, and the scope of the present disclosure is defined by the appended claims.

In order to solve the technical problem in the existing technology that the calibration of the laser level is limited by space, the inventors of the present disclosure thought of designing a method to enlarge a physical distance between the laser level and the laser detector by an optical device. Thus, the physical distance can be enlarged in the limited space to improve the calibration accuracy.

The device for calibrating the laser level disclosed according to the present disclosure is further described below in connection with the accompanying drawings.

Figure 1:
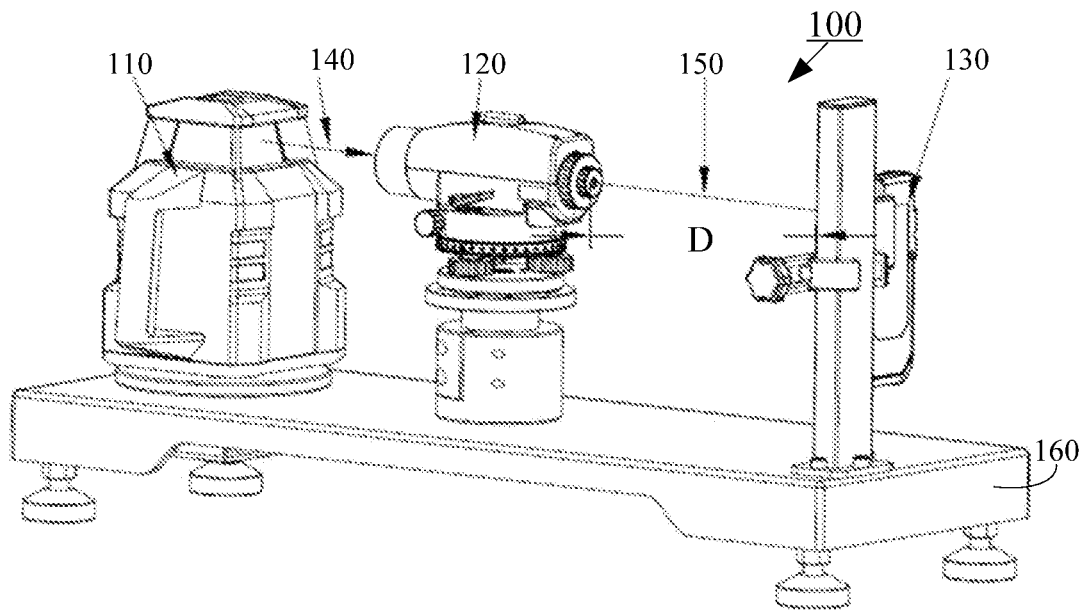
FIG. 1 is a schematic structural diagram of a device for calibrating a laser level according to an embodiment of the disclosure.

FIG. 1 is a schematic structural diagram of a device 100 for calibrating a laser level according to an embodiment of the disclosure. As shown in FIG. 1, the device 100 for calibrating the laser leveler includes a base platform 160. The base platform 160 may be configured to support a laser level 110 that is to be mounted on the base platform 160 at a first position. The device 100 further includes a laser detector 130. The laser detector 130 may be arranged at a second position of the base platform 160 and configured to receive a laser. The device 100 further includes an optical path extension device 120. The optical path extension device 120 may be arranged between the laser level 110 and the laser detector 130 and configured to receive the laser emitted by the laser level and project the laser to the laser detector after the laser is adjusted by the optical path extension device 120. The laser projected by the optical path extension device 120 may be, for example, a laser 150. With the optical path extension device 120, a physical distance between the laser level 110 and the laser detector 130 may be optically enlarged and extended. Thus, when the physical distance between the laser level 110 and the laser detector 130 is not changed, that is, the laser level 110 and the laser detector 130 are still at the base platform 160, a technical effect that the optical path distance between the laser level 110 and the laser detector 130 is lengthened can be simulated. Thus, the laser level 110 can be calibrated according to the enlarged optical path distance to improve the calibration accuracy. For example, when the physical distance between the laser level 110 and the laser detector 130 is only 30 centimeters, an optical distance between the laser level 110 and the laser detector 130 of 6 meters can be simulated. Thus, when the actual physical distance is not enlarged, that is, no requirement is imposed on the calibration space, the calibration accuracy that can be achieved by the distance of 6 meters can be realized.

Figure 2:
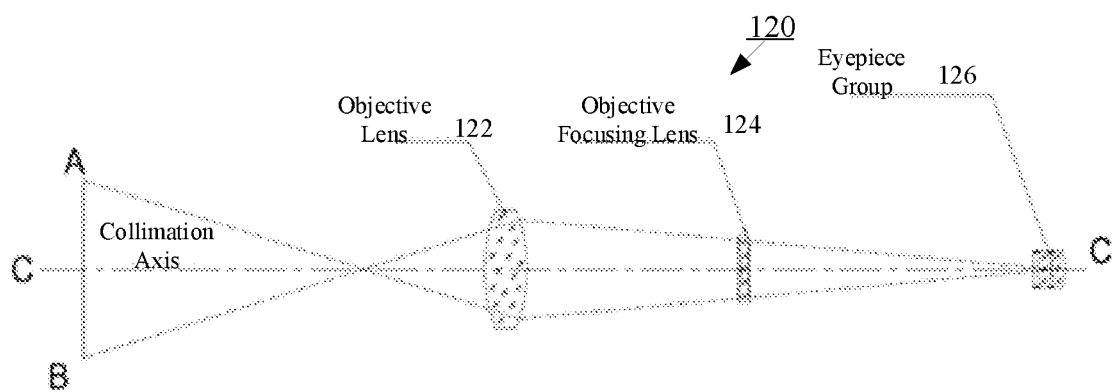
FIG. 2 is a schematic structural diagram showing an optical path extension device of the device for calibrating the laser level in FIG. 1 according to an embodiment of the disclosure.

In order to further illustrate an internal structure of the optical path extension device 120, FIG. 2 is a schematic structural diagram showing the optical path extension device 120 of the device 100 for calibrating the laser level in FIG. 1 according to an embodiment of the disclosure. As shown in FIG. 2, the optical path extension device 120 includes an objective lens 122. The objective lens 122 can be configured to receive the laser light emitted by the laser level 110. The optical path extension device 120 further includes an objective focusing lens 124. The objective focusing lens 124 can be configured to perform focusing processing on the laser received by the objective lens 122. The optical path extension device 120 further includes an eyepiece 126. The eyepiece 126 can be configured to project the laser adjusted by the objective focusing lens 124 to the laser detector 130. As such, the laser can be processed by the objective focusing lens 124 after being received by the objective lens 122 and then projected by the eyepiece 126 to the laser detector 130. Thus, the physical distance between the laser level 110 and the laser detector 130 can be optically enlarged after the processing of the objective focusing lens 124.

Figure 3:
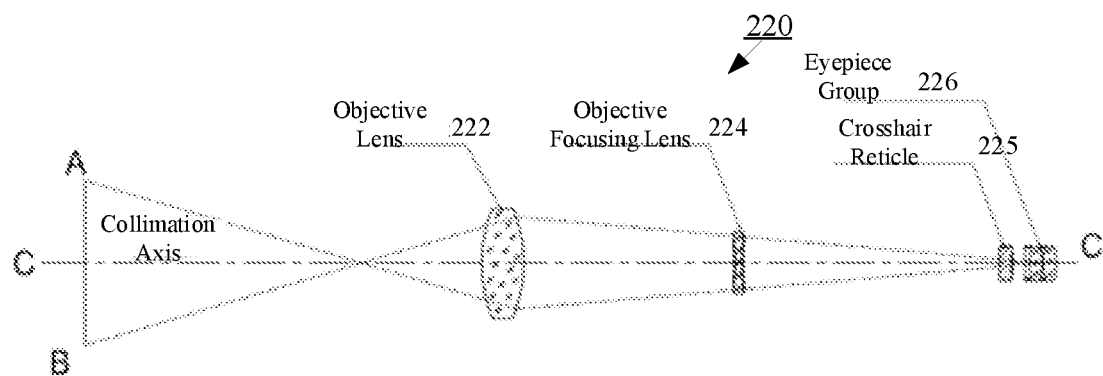
FIG. 3 is a schematic structural diagram showing another optical path extension device according to an embodiment of the disclosure.

In addition to the structure of the optical path extension device 120 shown in FIG. 2, the optical path extension device 120 also includes another optical structure. For example, FIG. 3 is a schematic structural diagram showing another optical path extension device 220 according to an embodiment of the disclosure. As shown in FIG. 3, the optical path extension device 220 includes an objective lens 222. The objective lens 220 can be configured to receive the laser emitted by the laser level 110. The optical path extension device 220 further includes an objective focusing lens 224. The objective focusing lens 224 may be configured to perform focusing processing on the laser received by the objective lens 222. The optical path extension device 220 further includes an eyepiece 226. The eyepiece 226 can be configured to project the laser that is adjusted by the objective focusing lens 224 to the laser detector 130. In addition, a difference from the optical path extension device 220 shown in FIG. 2 includes that the optical path extension device 220 further includes a crosshair reticle 225. The crosshair reticle 225 can be arranged between the objective focusing lens 224 and the eyepiece 226 and configured to perform assistant alignment on the laser. Thus, after being received by the objective lens 222, the laser can be processed by the objective focusing lens 224 and then projected by the eyepiece 226 to the laser detector 130. Therefore, the physical distance between the laser level 110 and the laser detector 130 can be optically enlarged after the laser is processed by the objective focusing lens 224. In an embodiment of the present disclosure, the objective lens can include an objective lens group including a group of objective lenses. That is, the objective lens can include a plurality of sub-objective lenses. Thus, the group formed by the plurality of sub-objective lenses can achieve a better optical effect.

In an embodiment of the present disclosure, the optical path extension device can have an optical path extension multiple/factor of a first multiple. In an embodiment of the present disclosure, the first multiple can be 32 times. For example, when the distance between the laser level 110 and the laser detector 130 is only 20 cm, and the first multiple is 32 multiples, the distance of, for example, 6.4 m between the laser level 110 and the laser detector 130 can be simulated. Thus, without enlarging the actual physical distance, that is, without imposing requirements on the calibration space, the calibration accuracy that can be achieved with the distance of 6.4 m can be realized. It can be understood that the multiple can also be 26 times, or the required multiple can be selected according to actual needs.

In an embodiment of the present disclosure, the optical path extension device can be configured as a level. A center of the optical path of the level can be aligned with the laser emitted by the laser level.

In an embodiment of the present disclosure, the base platform 160 can further include a control device (not shown in the figure). The control device can be configured to determine whether the laser level needs to be calibrated based on the simulated distance determined by based on the position data of the first position, the second position, and the third position and the optical extension multiple of the optical extension device, a deviation distance determined according to positions of lasers emitted by the laser level at the laser receiver before and after a rotation of a first angle, and the first angle. Thus, the laser level can be automatically calibrated.

In an embodiment of the present disclosure, the base can further include a rotation device. The rotation device can be configured to rotate the laser level by the first angle based on a control instruction received from the control device. In an embodiment of the present disclosure, the first angle can include an angle value of 180 degrees, 90 degrees, or 270 degrees.

In an embodiment of the present disclosure, when the control device determines that the laser level needs to be calibrated, the control device can determine a calibration signal based on the simulated distance, the deviation distance, and the first angle and transmit the calibration signal to the laser level. In an embodiment of the present disclosure, a wired connection or a wireless connection between the base platform and the laser level and/or between the base platform and the laser detector can exist. The wired connection or the wireless connection can be configured to transmit the calibration signal from the control device to the laser level. In an embodiment of the present disclosure, the wireless connection can include at least one of an infrared connection, a Bluetooth connection, or a WiFi connection. In an embodiment of the present disclosure, the device can further include a display unit. The display unit can be configured to display a maximum height difference determined based on the simulated distance, the deviation distance, and a maximum allowable error of the laser level.

In summary, according to the device for calibrating the laser level according to the present disclosure, the physical distance between the laser level and the laser detector can be optically enlarged and extended by the optical path extension device. Thus, without changing the physical distance between the laser level and the laser detector, the technical effect that the optical path distance between the laser level and the laser detector is enlarged can be simulated. Therefore, the laser level can be calibrated according to the enlarged optical path distance to improve the calibration accuracy.

Although various exemplary embodiments of the present disclosure have been described, it would be obvious to those skilled in the art that various changes and modifications can be made without departing from the spirit and scope of the present disclosure. One or some of the advantages of the present disclosure are realized within the scope of the present disclosure. Other components performing the same function may be substituted as appropriate to those skilled in the art. It should be understood that features explained herein with reference to a particular figure may be combined with features of other figures, even in those cases where this is not explicitly mentioned. Furthermore, the methods of the present disclosure may be implemented either in all software implementations using appropriate processor instructions or in hybrid implementations that utilize a combination of hardware logic and software logic to achieve the same results. Such modifications to the solution according to the present disclosure are intended to be covered by the appended claims.

Although various exemplary embodiments of the present disclosure have been described, various changes and modifications may be performed on the device apparent to those skilled in the art. One or some of the advantages of the present disclosure may be realized without departing from the spirit and scope of the content of the present disclosure. For those skilled in the art, other components performing the same function may be replaced appropriately. The features explained herein with reference to a particular figure may be combined with features of other figures, even in those cases where this is not explicitly mentioned. Furthermore, the methods of the present disclosure may be implemented either in all software implementations using appropriate processor instructions or in hybrid implementations that utilize a combination of hardware logic and software logic to achieve the same results. Such modifications to the solution according to the present disclosure are intended to be covered by the appended claims.

What is claimed is:

1. A device for calibrating a laser level comprising:
   a base platform configured to support the laser level that is to be mounted on the base platform at a first position;
   a laser detector arranged at a second position of the base platform and configured to receive a laser; and
   an optical path extension device arranged at a third position between the laser level and the laser detector and configured to receive the laser emitted by the laser level, project the laser to the laser detector after an optical path of the laser is adjusted by the optical path extension device, wherein the base platform further includes a control device configured to determine whether the laser level needs to be calibrated based on a simulated distance, a first angle, and a deviation distance determined by positions of lasers emitted by the laser level at the laser detector before and after a rotation of the laser level by the first angle, the simulated distance being determined by position data of the first position, the second position, and the third position and an optical path extension multiplication factor of the optical path extension device.

2. The device according to claim 1, wherein the optical path extension device includes:
an objective lens configured to receive the laser emitted by the laser level;
an objective focusing lens configured to perform focusing processing on a laser received by the objective lens; and
an eyepiece configured to project the laser adjusted by the objective focusing lens to the laser detector.

3. The device according to claim 2, wherein the optical path extension device further includes a crosshair reticle arranged between the objective focusing lens and the eyepiece.

4. The device according to claim 2, wherein the objective lens is an objective lens group including a group of objective lenses.

5. The device according to claim 1, wherein the optical path extension multiplication factor is predetermined.

6. The device according to claim 1, wherein the optical path extension device is configured as a level, a center of an optical path of the level being aligned with the laser emitted by the laser level.

7. The device according to claim 1, wherein the base platform further includes:
a rotation device configured to rotate the laser level by the first angle based on a control instruction received from the control device.

8. The device according to claim 1, wherein the first angle has an angle value of 180 degrees, 90 degrees, or 270 degrees.

9. The device according to claim 1, wherein, when determining that the laser level needs to be calibrated, the control device determines a calibration signal based on the simulated distance, the deviation distance, and the first angle and transmits the calibration signal to the laser level.

10. The device according to claim 9, wherein:
a wired connection or a wireless connection exists between the base platform and the laser level and/or between the base platform and the laser detector; and
the wired connection or the wireless connection is configured to transmit the calibration signal from the control device to the laser level.

11. The device according to claim 10, wherein the wireless connection includes at least one connection manner of an infrared connection or a WiFi connection.

12. The device according to claim 1, further comprising:
a display unit configured to display a maximum height difference value determined based on the simulated distance, the deviation distance, and a maximum allowable error of the laser level.

* * * * *